Figure 1:
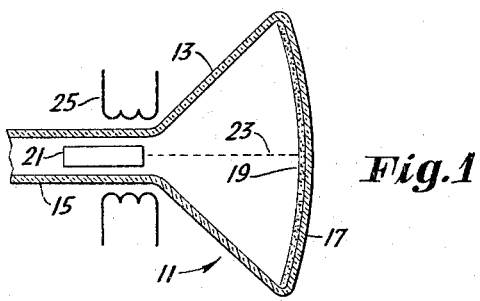

INVENTORS
LYLE W. EVANS
THADDEUS V. RYCHLEWSKI

United States Patent Office 3,005,125
Patented Oct. 17, 1961

3,005,125
DISPLAY SCREEN
Lyle W. Evans and Thaddeus V. Rychlewski, Seneca Falls, N.Y., assignors, by mesne assignments, to Sylvania Electric Products Inc., Wilmington, Del., a corporation of Delaware
Filed Dec. 5, 1957, Ser. No. 700,780
13 Claims. (Cl. 313—92)

This invention relates to image display screens for image reproduction devices such as cathode ray tubes and to the processing of such screens.

One type of apparatus adapted to produce, for example, color television images, employs a cathode ray tube having a screen formed with bars or stripes of red, green and blue color luminescing materials and with a plurality of spaced indexing strips or configurations. The indexing strips are generally positioned over the luminescent material in a predetermined manner and arrayed in either horizontal or vertical directions across the screen to provide an indexing pulse for controlling the horizontal or vertical scanning movements of the electron beam or beams employed in the tube.

The type of color tube screen described above is generally formed by stenciling or photographic techniques to build-up appropriate screen layers over the viewing panel of the tube. The color fluorescing stripes or bars are first formed on the panel, along with guard bands, if desired, followed by lacquering and aluminizing operations. The aluminum film thus formed is then covered with another layer of lacquer and the indexing stripes are subsequently deposited thereon. When the panel is heated, the lacquer volatilizes, thereby effecting deposit of the aluminum film on the luminescent materials and the index stripes on the aluminum film.

It has been found that the use of such a process very often results in tube rejects due to reticulation of the aluminum film, increased gas level within the tube arising primarily from the double lacquer operation, and incorrect registration of the indexing stripes relative to the luminescent material configurations.

Accordingly, an object of the invention is to reduce the aforementioned disadvantages and to simplify the processing of image display screens.

Another object is to eliminate the need for forming geometrical screen configurations after the electron permeable film has been deposited on the screen.

A further object is to provide accurate registration between the various screen components and to improve the reproduction of display images.

The foregoing objects are achieved in one aspect of the invention by the provision of a process for forming image display screens and of the improved screens produced thereby. The viewing panel of the display device or cathode ray tube may have deposited thereon a plurality of luminescent material strips or configurations. If desired, these strips may be separated from one another by non-luminescent materials which serve as guard bands. The indexing stripes, which operate as an electron responsive signal translator, are positioned over the guard bands. In those instances where it is desirable to employ a light reflective film, the screen thus formed is then covered with a smooth coating of a volatile material such as lacquer, and the reflective film is subsequently formed thereon. When the viewing panel is heated, the volatile material is removed and the reflective film drops upon the screen patterns. If an oxidizing agent for the reflective film is used in conjunction with the indexing stripe material, those portions of the film which contact the indexing material during the heating operation will become oxidized. Therefore, since the oxide is substantially transparent and electron permeable, any second emissive or radiant energy responsive characteristics of the indexing material may be utilized for controlling operation of the electron beam scan without an appreciable diminution in the signal strength.

The luminescent materials employed in the screen may be any conventional type of electric field and/or electron-responsive inorganic material such as those formed from sulfides, oxides, tungstates, aluminates, borates, selenides, phosphates or silicates of one or more metals consisting of zinc, cadmium, beryllium, magnesium, calcium, strontium and others well known in the art. These substances may be activated by metals such as silver, copper and manganese.

The materials used for providing an index signal may comprise any electron emissive substance such as oxides of the alkaline earth metals including barium, strontium and calcium in addition to oxides of other elements such as thorium. The index signal material may also comprise any radiant energy source material like those substances which provide light energy in the visible and invisible spectrum. Such materials include phosphors of sulfides, silicates and oxides. Some of the more commonly used fast decay light emitters are cerium activated calcium silicate, zinc activated zinc oxide, and silver activated zinc sulphide.

The oxidizing agents employed in the process may include generally the peroxides, permanganates and perchlorates and more specifically such compositions as barium chlorate, ammonium dichromate, or potassium dichromate.

For a better understanding of the invention, reference is made to the following description taken in conjunction with the accompanying drawings in which:

FIG. 1 is a plan view of a typical image display device of the type adapted to be used in color television apparatus; and FIGS. 2 through 6 illustrate several of the steps utilized in the processing of image display screens of the type which are adapted for use in a reproduction device such as is shown in FIG. 1.

Referring to FIG. 1, a cathode ray tube 11 is shown comprising an envelope 13 having a neck portion 15 and a transparent viewing panel 17. Formed on the internal surface of the panel is an electron responsive image display screen 19. An electron gun or guns 21, which are positioned within neck 15, are formed to provide the source, acceleration, control and modulation of beams 23. Deflection coils 25 are positioned relative to cathode ray tube 11 to produce electron beam scanning of screen 19 when properly energized.

The screen may comprise a plurality of serially arrayed red, green and blue color luminescent strips arranged in horizontal or vertical directions. The tube described herein also employs indexing stripes which are arranged in a predetermined manner relative to the color luminescing configurations. These indexing stripes provide a signal when bombarded by electron beams 23 which may be picked up by an appropriately positioned receiver (not shown) to control the scanning movements of the beam. Such a receiver may comprise a light cell if the indexing stripes are light emissive in the visible or invisible spectrum, or it may be formed as an electrode if the indexing stripes provide secondary electron emissive characteristics.

Figure 6:
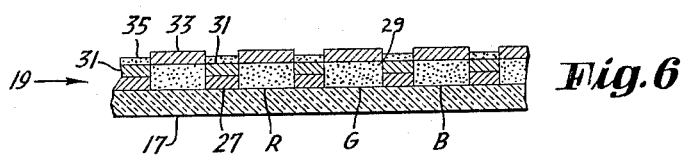

Referring to FIG. 6, the screen 19 may have a large number of non-luminescent guard bands 27 deposited on panel 17 in spaced relationship with one another. Disposed intermediate bands 27 are the red, green and blue color luminescing strips 29. The guard bands serve to provide a masking effect so that the edges of strips 29 do not appear irregular in the finished tube. When this occurs, the color reproduction of an image may be impure and the image definition may be poor.

Positioned behind bands 27 and intermediate the R, G and B strips 29 are the electron responsive signal translating or indexing stripes 31. If desired, these indexing stripes may be on either side of each strip 29 or after each color triad, i.e. each successive group of red, green and blue luminescing strips 29. An electron permeable light reflective film 33 is shown disposed upon luminescent strips 29 to provide improvement in the contrast characteristics of the reproduced image. However, not all cathode ray tubes utilize this type of reflective film, and it is not intended to restrict this invention to the application of such an element. If a reflective film of the metallic type is utilized, it is preferable to oxidize those portions thereof which cover the indexing material 31 so that there will be no diminution in indexing signal strength, which is usually directed backward in the tube. This is accomplished by incorporating an oxidizing agent in the indexing material so that the metallic film will oxidize when heat is applied to provide the substantially transparent electron permeable coating 35.

Figure 2:
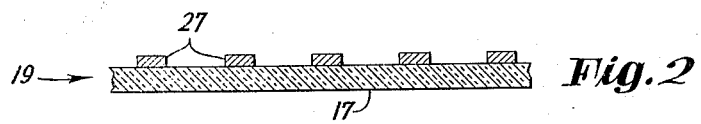
Figure 3:
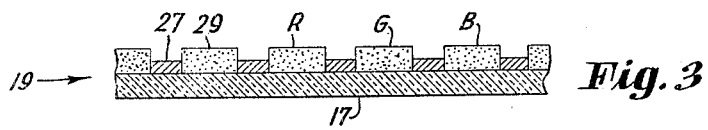

The image display screen described above may be formed by utilizing photographic printing, stenciling, silk screening or other known screen forming techniques. If a photographic process is employed, the guard bands may first be formed by depositing upon the panel a composition containing a light hardenable or photosensitive substance such as polyvinyl alcohol sensitized with ammonium dichromate and a non-luminescent material such as iron oxide by flowing, swirling, spraying or slurry operations. This composition is then exposed to light through an appropriately formed pattern negative or mask. The exposed portions of the composition harden and adhere to panel 17 and the unexposed portions are subsequently removed by washing the panel with a suitable solvent for the sensitized polyvinyl alcohol such as deionized water. This operation provides a plurality of spaced bands 27 of non-luminescent materials over the screen area as shown in FIG. 2. The guard bands may comprise any substantially non-luminescent material such as oxides of iron, manganese, magnesium or lead.

The photo-sensitive or light hardenable substance may comprise any well known formulation which is rendered non-dispersible or substantially insoluble in the specific solvent used in the process after being exposed to light. Among the materials suitable for use in the production of image display screens are photographic gelatins, polyvinyl alcohol, polyvinyl pyrrolidone and polyvinyl acetate sensitized with such substances such as ammonium, potassium or sodium dichromates, monomeric type dye-sensitized polymers, and a variety of lacquers such as Kodak Photosensitive Lacquer (KPL), which has incorporated therein a volatile sensitizer.

The solvent or developing fluid used in the process is dependent upon the choice of photosensitive material which is employed. For instance, an organic solvent such as trichloroethylene or a ketone may be used with commercial photosensitive lacquers and with polyvinyl acetate whereas other substances such as polyvinyl alcohol are water soluble.

After bands 27 have been formed, the color luminescing strips 29 are deposited upon panel 17. This is accomplished by forming in a desired sequence the red, blue and green phosphor patterns. The panel 17 is coated with a composition of the photosensitive substance, polyvinyl alcohol sensitized with ammonium dichromate and, for instance, the electron responsive red phosphor, zinc phosphate. This composition may be applied as a slurry or the phosphor may be dusted over previously applied sensitized polyvinyl alcohol. The coating thus formed is then exposed to light through an appropriately formed and positioned negative. Those portions of the composition which were exposed to light become hardened and adhere to the panel. Subsequently, the coating is washed thoroughly with deionized water to remove the unexposed portions of the phosphor and photosensitive material. This thorough washing removes substantially all of the soluble ammonium dichromate from the composition.

The above process is repeated with the separate applications of the green phosphor, zinc orthosilicate and the blue phosphor, zinc sulfide. During each subsequent light exposure operation, the pattern negative is offset from its previous position to provide the discrete green, red and blue patterns, G, R and B respectively, shown in FIG. 3.

Figure 4:
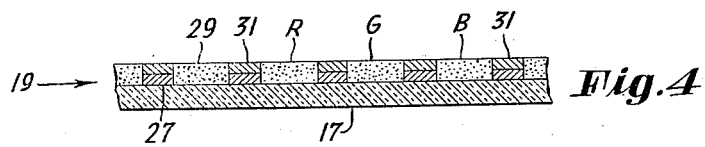

The electron responsive signal translating or indexing stripes 31 are then formed over guard bands 27 by another photo-printing operation. A composition comprising the fast decay light emitting indexing material, cerium activated calcium silicate in addition to polyvinyl alcohol sensitized with ammonium dichromate and an oxidizing agent such as potassium dichromate, is then deposited over the screen. Instead of using potassium dichromate, and excess of ammonium dichromate in the polyvinyl alcohol solution may be used to function as the oxidizing agent. Again, the composition is exposed to light through an appropriately formed and positioned negative to provide hardened areas disposed over stripes 27 as shown in FIG. 4. The unexposed and unhardened areas are again removed by a photosensitive solvent rinse such as deionized water. However, due to the excessive dichromate in the composition, some dichromate remains in the hardened or exposed portions 31. This serves as an oxidizing agent capable of operating upon the metallic film to be later applied.

Figure 5:
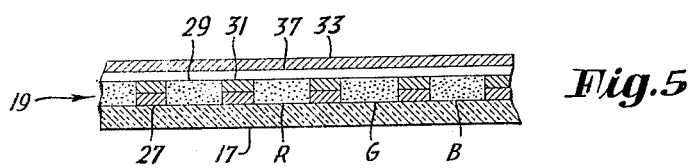

A base material for the electron permeable film is next sprayed, flowed or deposited from a liquid cushion upon the above described screen to provide a smooth coating 37. This material may comprise any volatile medium such as methacrylate or nitrocellulose lacquer. The electron permeable light reflective film 33 is then vaporized or otherwise deposited upon lacquer 37 as shown in FIG. 5. Such a film may comprise metals like aluminum, tin, silver, or chromium.

The screen forming operation is completed by baking the panel at an elevated temperature. During this heating operation, the lacquer 37 volatilizes and film 33 settles upon the indexing and luminescing materials. Those areas 35 of the metallic film 33 which contact the indexing stripes 31 become oxidized due to the oxidizing agent present in the indexing stripe material. The metallic film 33 disposed upon the luminescent materials 29 provide a back reflective film which enhances the brightness and contrast characteristics of the tube.

Since the metallic oxide layer 35 is electron permeable and substantially transparent, the index signal provided by stripes 31 upon bombardment of electron beams 23 is not diminished appreciably.

A screen formed by the above described process exhibits improved signal response characteristics and improved contrast, and provides for the reproduction of color images having a higher degree of color purity.

Although several embodiments of the invention have been shown and described, it will be apparent to those skilled in the art that various changes and modifications may be made therein without departing from the scope of the invention as defined by the appended claims.

What is claimed is:

1. A method of forming an image display screen on the viewing panel of an image reproduction device comprising the steps of forming a plurality of spaced substantially non-luminescent material configurations on said panel, depositing luminescent material intermediate said configurations, covering the configurations with a composition containing an oxidizing agent and an electron responsive signal translation material, coating the screen thus formed with a metallic film, and heating the panel to oxidize the areas of said film in contact with the oxidizing agent.

2. A method of forming an image display screen on the viewing panel of an image reproduction device comprising the steps of forming a plurality of spaced substantially non-luminescent material configurations on said panel, depositing electron responsive luminescent material intermediate said configurations, covering the configurations with a composition including an oxidizing agent and a light emissive substance, coating the screen thus formed with a layer of an electron permeable light reflective film, and heating the panel to oxidize the areas of said film in contact with the oxidizing agent.

3. A method of forming an image display screen on the viewing panel of an image reproduction device comprising the steps of forming a plurality of spaced substantially non-luminescent material configurations on said panel, depositing electron responsive luminescent material intermediate said configurations, covering the configurations with a composition including an oxidizing agent and an electron emissive substance, coating the screen thus formed with a layer of an electron permeable light reflective film, and heating the panel to oxidize the areas of said film in contact with the oxidizing agent.

4. A method of forming an image display screen on the viewing panel of an image reproduction device comprising the steps of forming a plurality of spaced substantially non-luminescent material configurations on said panel, depositing electron responsive luminescent material intermediate said configurations, covering the configurations and luminescent material with a light hardenable composition including a dichromate and an electron responsive signal translating material, exposing the portions of said composition disposed upon the configurations to light, removing the unexposed portions of said composition, coating the screeen thus formed with a layer of an electron permeable light reflective film, and heating the panel to oxidize the areas of said film in contact with the composition.

5. A method of forming an image display screen on the viewing panel of an image reproduction device comprising the steps of forming a plurality of spaced substantially non-luminescent material configurations on said panel, depositing electron responsive luminescent material intermediate said configurations, covering the configurations and luminescent material with a light hardenable composition including a dye-sensitized polymer, an oxidizing agent and an electron responsive signal translating material, exposing the portions of said composition disposed upon the configurations to light, removing the unexposed portions of said composition, coating the screen thus formed with a layer of an electron permeable light reflective film, and heating the panel to oxidize the areas of said film in contact with the composition.

6. A method of forming an image display screen on the viewing panel of an image reproduction device comprising the steps of forming a plurality of spaced substantially non-luminescent material configurations on said panel, depositing electron responsive luminescent material intermediate said configurations, covering the configurations and luminescent material with a light hardenable composition containing an electron responsive signal translating material, exposing the portions of said composition disposed upon the configurations to light, and removing the unexposed portions of said composition.

7. A method of forming an image display screen on the viewing panel of an image reproduction device comprising the steps of forming on the panel a screen pattern having a plurality of spaced configurations of a composition including an oxidizing agent and an electron responsive signal translating material and having luminescent material disposed intermediate said configurations, coating the screen thus formed with a metallic film, and heating the panel to oxidize the areas of said film in contact with the oxidizing agent.

8. A method of forming an image display screen on the viewing panel of an image reproduction device comprising the steps of forming on the panel a screen pattern having a plurality of spaced substantially non-luminescent material configurations and having luminescent material disposed intermediate said configurations, covering the configurations with a composition containing an oxidizing agent and an electron responsive signal translating material, coating the screen thus formed with a metallic film, and heating the panel to oxidize the areas of said film in contact with the oxidizing agent.

9. A screen for an image reproduction device having a viewing panel comprising a plurality of spaced substantially non-luminescent material configurations disposed on said panel, a layer of luminescent material positioned upon said panel intermediate each of said configurations, each luminescent layer having light emissivity characteristics different from the adjacent luminescent material layers, and a layer of an electron responsive signal translating material positioned exclusively behind said configurations.

10. A screen for an image reproduction device having a viewing panel comprising a plurality of spaced substantially non-luminescent material configurations disposed on said panel, a layer of luminescent material positioned upon said panel intermediate said configurations, a layer of an electron responsive signal translating material positioned behind said configurations, and a film of electron permeable light reflective material disposed upon said luminescent material.

11. A screen for an image reproduction device having a viewing panel comprising a plurality of spaced substantially non-luminescent material configurations disposed on said panel, a layer of luminescent material positioned upon said panel intermediate said configurations, a layer of an electron responsive signal translating material positioned behind said configurations, an electron permeable light reflective metallic film disposed upon said luminescent material, and an oxide of said film covering said non-luminescent material.

12. A screen for an image reproduction device having a viewing panel comprising a plurality of spaced substantially non-luminescent material configurations disposed on said panel, a layer of luminescent material positioned upon said panel intermediate said configurations, and a layer of secondary electron emissive material positioned exclusively behind each of said configurations.

13. A screen for an image reproduction device having a viewing panel comprising a plurality of spaced substantially non-luminescent material configurations disposed on said panel, a layer of luminescent material positioned upon said panel intermediate said configurations, and a layer of light emissive material positioned exclusively behind each of said configurations.

References Cited in the file of this patent

UNITED STATES PATENTS

| | | |
|---|---|---|
| 2,557,368 | Schultz et al. | Dec. 4, 1951 |
| 2,585,614 | Bailey et al. | Feb. 12, 1952 |
| 2,740,065 | Jesting | Mar. 27, 1956 |
| 2,743,312 | Bingley | Apr. 24, 1956 |
| 2,767,346 | Hoyt | Oct. 16, 1956 |
| 2,771,567 | Weimer | Nov. 30, 1956 |
| 2,778,971 | Sunstein | Jan. 22, 1957 |
| 2,787,556 | Haas | Apr. 2, 1957 |
| 2,790,107 | Bradley | Apr. 23, 1957 |
| 2,806,899 | Zworykin | Sept. 17, 1957 |
| 2,842,697 | Bingley | July 8, 1958 |
| 2,858,364 | Bradley | Oct. 28, 1958 |
| 2,892,123 | Sunstein | June 23, 1959 |